No. 794,110. PATENTED JULY 4, 1905.
R. G. McDOWELL.
COUPLING.
APPLICATION FILED SEPT. 20, 1904.
2 SHEETS—SHEET 1.
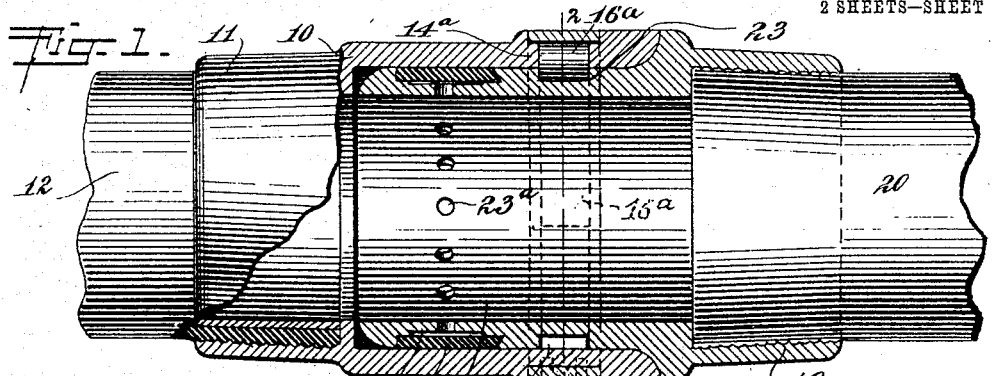
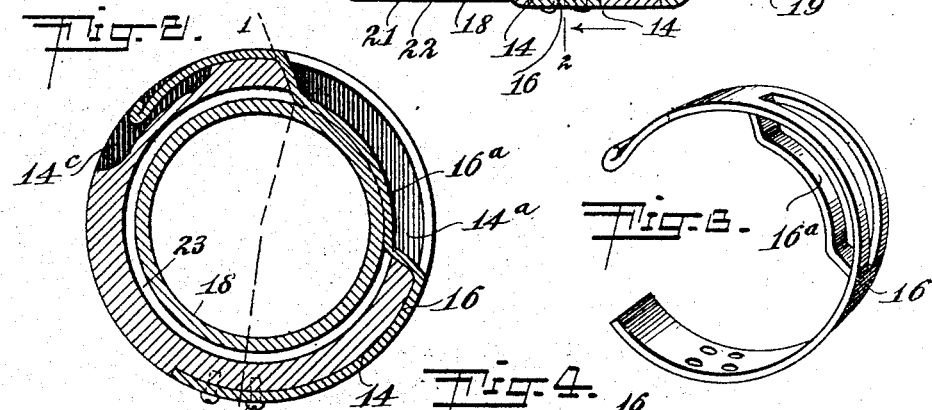
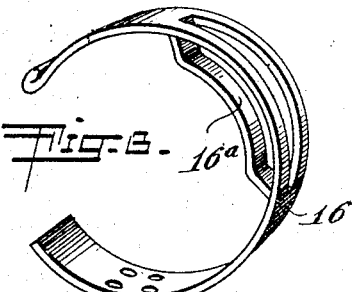
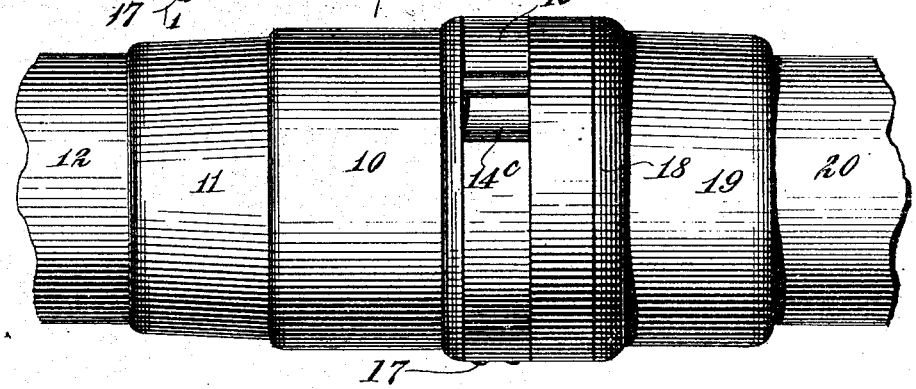
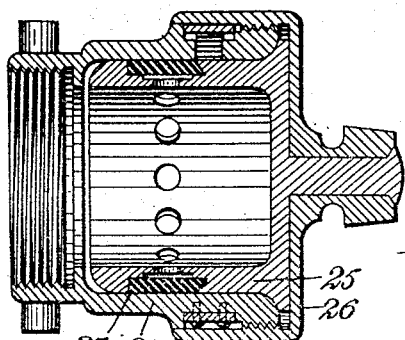
WITNESSES:
INVENTOR
Robert G. McDowell
BY
ATTORNEYS

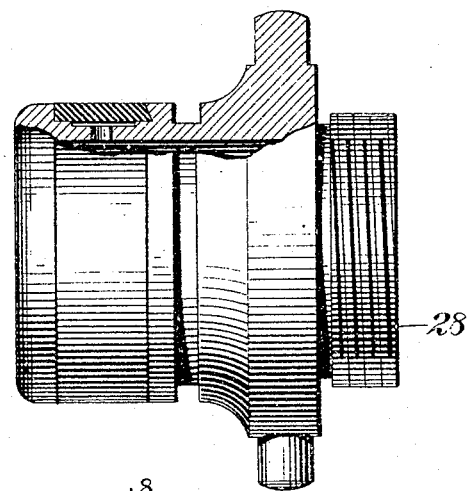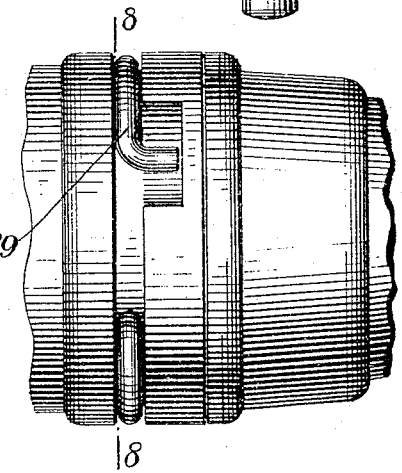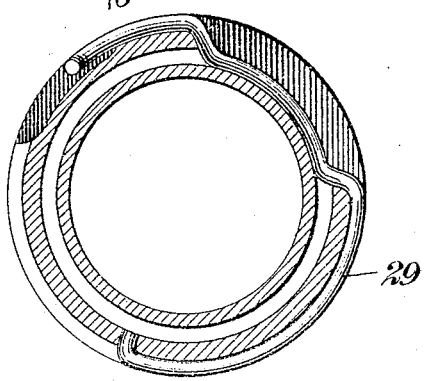

No. 794,110.

Patented July 4, 1905.

UNITED STATES PATENT OFFICE.

ROBERT GEORGE McDOWELL, OF ANACONDA, MONTANA.

COUPLING.

SPECIFICATION forming part of Letters Patent No. 794,110, dated July 4, 1905.

Application filed September 20, 1904. Serial No. 225,196.

*To all whom it may concern:*

Be it known that I, ROBERT GEORGE MC-DOWELL, a citizen of the United States, and a resident of Anaconda, in the county of Deer-lodge and State of Montana, have invented a new and Improved Coupling, of which the following is a full, clear, and exact description.

The invention relates to a coupling intended to join sections of pipes and hose and also for use in connecting nozzles and fire-plugs and various other analogous uses.

The coupling comprises mating sections fitting one within the other, the coupling having a peculiar packing, making a hermetic joint and the outer section carrying a peculiar spring-dog capable of projecting a part through an opening in the outer section into engagement with a shoulder on the inner section, thus removably yet securely holding the sections engaged.

The invention resides in certain novel features of construction and arrangement, the particulars of which will be hereinafter fully set forth, and pointed out in the claims.

Reference is had to the accompanying drawings, illustrating various forms of the invention, in which drawings like figures of reference indicate like parts throughout the views, and in which—

Figure 1 is a view of the coupling with parts in section on the line 1 1 of Fig. 2. Fig. 2 is a cross-section on the line 2 2 of Fig. 1. Fig. 3 is a detail perspective of the spring-dog in its preferred embodiment. Fig. 4 is an exterior elevational view of the coupling. Fig. 5 is a sectional view showing the coupling in connection with a hydrant-plug. Fig. 6 is a partly-sectional side view of a nozzle connection employed. Fig. 7 is a side view of a modification, and Fig. 8 is a transverse sectional view substantially on the line 8 8 in Fig. 7.

Referring particularly to Figs. 1 to 4, the outer section of the coupling comprises a body part 10 and a tubular extension 11, with which the hose or pipe section 12 is connected in any suitable manner. The body part 10 of the outer section has a groove 14 extending partly around its outer side, and communicating with this groove is an opening 14ª, which extends inward completely through the body 10 of the coupling. The body 10 of the coupling also has a cavity 14° in its outer surface, this cavity lying at and communicating with one end of the groove 14. The spring-dog is preferably formed of a flat metallic spring 16, one end of which is secured by screws 17 or the like in one end of the groove 14, the spring 16 extending through said groove and having its end lying over the cavity 14°. The spring 16 has an inwardly-located strip 16ª, which preferably is struck or stamped from the spring, as shown in Fig. 3, said strip lying opposite the opening 14ª, so that when the spring-dog is in active position the strip projects through the opening 14ª and lies inward of the inner walls of the body 10. By inserting one's finger within the cavity 14° the spring-dog may be moved outward sufficiently to withdraw the strip 16ª from its position inward of the inner surface of the body 10, so as to disengage this part 16ª of the dog from the inner member of the coupling, as will be hereinafter fully set forth. The inner member of the coupling has a tubular body 18 and an extension 19, and in the said extension 19 the hose-section 20 is suitably fastened. The body member 18 of the inner coupling-section is intended to fit snugly into the body 10 of the outer coupling-section, and said body has an annular groove 21 extending around its outer surface and receiving a packing-gasket 22, of rubber or other equivalent material. Said body 18 has a series of openings 23ª therein establishing communication between the interior of the body and the said groove 21, so that the fluid-pressure within the coupling and hose-sections 12 and 20 may be exerted on the inner side of the gasket 22, forcing the same outward in contact with the inner walls of the body 10 of the coupling, thus forming a hermetic connection between the two parts. The body 18 is provided with an annular groove 23 extending around its outer circumference and adapted when the coupling-sections are engaged to lie in transverse lines with the groove 14 and opening 14ª, so that when the spring-dog 16 is in its active position the inwardly-lying strip or part 16ª thereof projected through the opening 14ª will with the walls of the said groove 23, and thus lock the coupling-sections together.

In the use of the invention the free end of the spring-dog 16 should be moved outward in the manner before explained, so as to bring the part 16ᵃ of the dog out of its position inward of the inner surface of the outer coupling-section. Then the two coupling-sections may be engaged together, as shown in Fig. 1, and upon permitting the spring-dog to return to its active position the part 16ᵃ of said dog will engage with the walls of the groove 23, thus locking the sections together. It will be observed that this arrangement affords a secure connection between the sections, while the gasket 22 makes that connection hermetic. Owing to the location of the spring-dog 16 within the groove 14, there is practically no danger of the accidental outward movement of the dog resulting in a disengagement of the coupling-sections, while owing to the arrangement of the spring-dog, and especially its connection with the cavity 14ᶜ, said dog may be readily manipulated when desired.

It is clear that the invention may be used in various connections other than that of joining two sections of hose or pipe, such as shown in Fig. 1. For instance, it may be employed to connect the plug or stopper of a fire-hydrant. This latter arrangement is shown in Fig. 5, in which the fire-hydrant plug 24 forms the outer member of the coupling and is arranged to operate with the inner member attached to a fire-hose and constructed as shown in Fig. 1. 25 indicates the stopper, which fits loosely in the plug and is held by the screw-cap 26. Said stopper is provided with a gasket 27, the same as the gasket 22 in Fig. 1.

Fig. 6 illustrates the inner member of the coupling, provided with a threaded neck 28, enabling it to be engaged with a nozzle.

Figs. 7 and 8 illustrate the coupling with a round spring 29 operating in place of the flat spring 16. (Shown in Fig. 1.)

Various changes in the form, proportions, and minor details of my invention may be resorted to at will without departing from the spirit and scope thereof. Hence I consider myself entitled to all such variations as may lie within the terms of my claims.

Having thus described my invention, I claim as new and desire to secure by Letters Patent—

1. The combination of two coupling-sections adapted to fit one within the other, the outer coupling-section having an opening extending through it, and the inner coupling-section having a shoulder and a spring-dog secured on the outer section and extending around the outer side of the said section, said dog having an inwardly-projecting portion adapted to project through the opening in the outer section into engagement with the shoulder on the inner section.

2. The combination of two coupling-sections adapted to fit one within the other, the outer section having an opening therein, and the inner section having a shoulder, a dog formed of a flat spring secured to the outer side of the outer section and having a strip struck therefrom, said strip lying inward of the dog and adapted to extend through the opening of the outer section into engagement with the said shoulder on the inner section.

3. The combination of two coupling-sections adapted to fit one within the other, the outer section having an external groove, an opening in the groove, and a recess at one end of said groove, and the inner section having an annular groove, and a spring secured at one end in the groove and having its other end resting in the recess, the spring being provided intermediate of its ends with an inwardly-projecting portion entering the said opening.

In testimony whereof I have signed my name to this specification in the presence of two subscribing witnesses.

ROBERT GEORGE McDOWELL.

Witnesses:
M. J. FITZ PATRICK,
HARRY NEAL.